United States Patent [19]
Giacoma, Jr. et al.

[11] 3,788,514
[45] Jan. 29, 1974

[54] EXPLOSION RELIEF COVER RESTRAINT

[75] Inventors: Frederick Alfred Giacoma, Jr., Crestwood; Channing W. Godbold, St. Louis; Richard Wilson Stephens, Bridgeton, all of Mo.

[73] Assignee: Monsanto Company, St. Louis, Mo.

[22] Filed: Dec. 29, 1969

[21] Appl. No.: 888,623

[52] U.S. Cl............. 220/89 A, 137/67, 220/44 R, 220/88 R
[51] Int. Cl..................... B65d 51/16, B65d 55/02
[58] Field of Search 220/88 A, 89 A, 44, 88 R, 44 R; 137/67; 116/118, 116

[56] References Cited
UNITED STATES PATENTS

| | | | |
|---|---|---|---|
| 2,499,190 | 2/1950 | Holmgren | 220/44 X |
| 1,298,884 | 4/1919 | Chalfant | 220/44 X |
| 1,445,869 | 2/1923 | Chalfant | 220/44 |
| 1,637,298 | 7/1927 | Garcia | 220/88 |
| 2,333,547 | 11/1943 | Neumann | 220/88 X |

FOREIGN PATENTS OR APPLICATIONS

| | | | |
|---|---|---|---|
| 433,290 | 10/1911 | France | 220/88 |

*Primary Examiner*—George E. Lowrance

[57] ABSTRACT

An explosion relief device comprises a displaceable cover of a vessel connected to a fixed base by an extensible restraint. Movement of the cover away from the vessel as a result of the force of an explosion within the vessel distorts the restraint beyond its elastic limit. The distortion of the restraint beyond its elastic limit absorbs the energy of the cover moving away from the vessel, safely stops the cover and does not substantially accelerate the cover's return after it has performed its venting function. The method of restraining the displaceable cover is also disclosed. This device and method are particularly useful with large vessels requiring full diameter venting.

9 Claims, 7 Drawing Figures

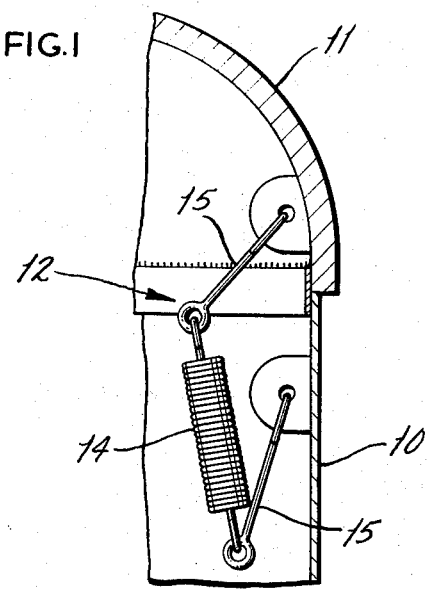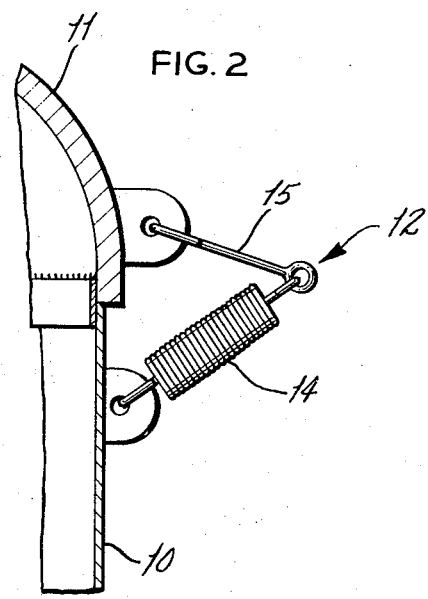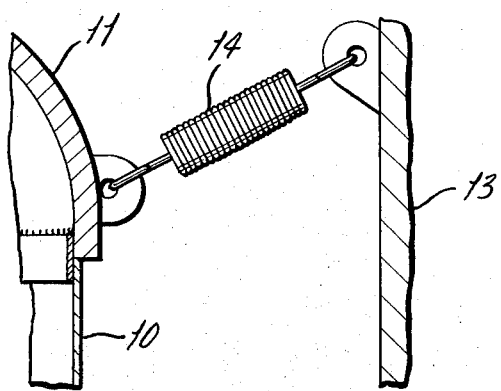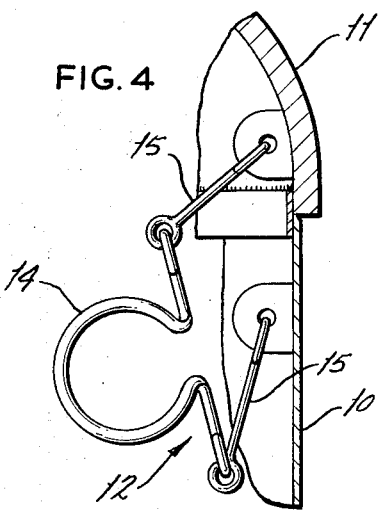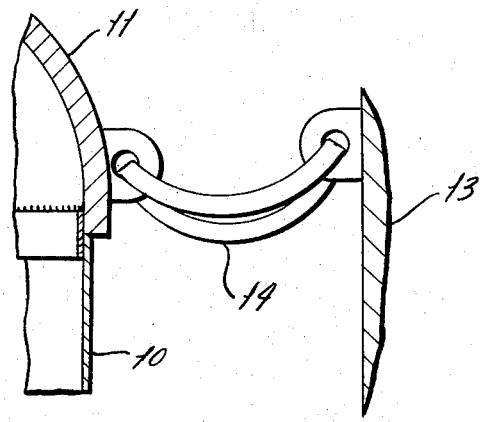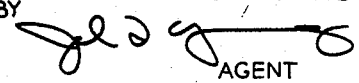

EXPLOSION RELIEF COVER RESTRAINT

FIELD OF THE INVENTION

This invention relates to explosion relief devices. More particularly the invention relates to explosion relief devices for large vessels requiring full vessel diameter venting. The invention also relates to a method for restraining the movement of a vessel head or cover after displacement by an explosion internal to the vessel.

DESCRIPTION OF THE PRIOR ART

Various pressure relief devices are known. Such devices include pressure relief valves, explosion rupture discs and removable vessel heads and hatch covers. Removable heads and hatch covers may be held in place by low strength welds or shear pins, attached to the vessel by a hinge or slack inextensible linkages or not attached to the vessel at all, being held in place only by their own weight. When an explosion occurs within a vessel the removable head or hatch cover is displaced by the force of the explosion allowing the compressed gases to escape without damaging the other parts of the vessel. The surface area necessary to vent an explosion without damage to the vessel or with only nominal damage requiring merely minor repairs may be readily calculated. Where the removable heads or hatch covers are small in size, their movement after displacement from their normal position on the vessel may be restrained by attaching the hatch cover or head to the vessel by a slack inextensible linkage so that the cover is free to move a limited distance from the vessel until the inextensible linkage is fully extended at which point the inextensible linkage prevents further movement by the cover away from the vessel. Where the cover is attached to the vessel by a hinge, the cover is displaced from the opening by the force of the explosion but the motion is directed pivotally about the hinge which constrains movement of the cover away from the vessel, while allowing the cover to completely clear the opening. Likewise, where the cover is small or light in weight it may be attached to the vessel by low strength welds, shear-pins or not attached to the vessel at all. In these instances, once the cover is displaced from the opening its movement is unrestrained and its ultimate place of repose is indeterminate. It is also known to attach a cover to a vessel by spring means whereby the excess pressure displaces the cover from the opening loading the springs in such manner that when the excess gas escapes, the stored energy in the springs causes the cover to return to its original position.

Economics dictate that a vessel be designed to withstand no more pressure than deemed necessary to meet desired safety standards. Full vessel diameter venting is a useful design technique which minimizes the necessary pressure rating of a vessel. However, when displacement from the vessel of the entire head is the venting technique used, the movement of the head after displacement from the vessel becomes a serious problem particularly in large diameter vessels. Unrestrained movement of the head after displacement from the vessel is highly undesirable due to the great danger of the head injuring nearby personnel, equipment or structures as it falls under the force of gravity. On the other hand, the conventional restraining devices described above are almost equally unsatisfactory when used with large size covers and heads. If movement of the head after displacement from the vessel is restrained by a mechanism which acts in the manner of a spring to store elastically all the energy imparted to the head by the force of the explosion, once the movement of the head has been slowed to a stop, the spring-like restraining mechanism begins to accelerate the head in the opposite direction back against the vessel. The amount of force exerted by the returning cover or head can be great enough to cause serious damage to the vessel, the head, or both. Attaching such a cover or head to the vessel by a slack inextensible linkage or a hinge is also unsatisfactory. An inextensible linkage attempts to stop the cover abruptly in its movement away from the vessel as a result of an explosion in the vessel. If the cover is large in size and massive in weight, the abrupt arresting of cover movement away from the vessel suddenly concentrates high stress on the connecting points where the linkage is attached to the vessel. There is presently no practical economic method to distribute the stress or to reinforce the connecting points to prevent failure of either the linkage or the connecting points under such a sudden application of high stress. If a hinge is employed to connect a large or massive cover to the vessel, there is still danger of damage. The hinge, if it does not fail under the concentration of stress at the pivot point when the cover is displaced by an explosion, does not restrain movement of the cover but only restrains the direction of the movement of the cover. Thus, the displaced cover rapidly pivots on the hinge, and if its velocity is not slowed in some manner, will slam against the outside of the vessel with sufficient force to damage the cover, the vessel or both. From a review of present methods for restraining large covers it is evident that there is currently no practical economic method for restraining the movement of such covers when displaced by an explosion in a manner that will prevent damage to the cover, the vessel or to nearby personnel or equipment.

SUMMARY OF THE INVENTION

The explosion relief device of this invention comprises a vessel, a displaceable cover on the vessel, a fixed base, and an extensible restraint wherein the cover is connected to the fixed base by the restraint so that when an explosion occurs within the vessel, the cover moves away from the vessel and distorts the restraint beyond its elastic limit and the restraint in turn, decelerates and stops the cover without substantially accelerating the cover's return. The method of this invention comprises connecting a displaceable cover to a fixed base so that when an explosion occurs within the vessel, the cover moves away from the vessel and distorts the restraint beyond its elastic limit and the restraint, in turn, decelerates and stops the cover without substantially accelerating the cover's return.

BRIEF DESCRIPTION OF THE DRAWINGS

FIG. 1 is a transverse, vertical, sectional view of an explosion relief device showing a restraint which is a spring mounted inside a vessel to connect the vessel cover to the vessel.

FIG. 2 is a transverse, vertical, sectional view of an explosion relief device showing a restraint which is a spring mounted outside a vessel to connect the vessel cover to the vessel.

FIG. 3 is a transverse, vertical, sectional view of an explosion relief device showing a restraint which is a spring mounted outside a vessel to connect the vessel cover to a fixed base.

FIG. 4 is a transverse, vertical, sectional view of an explosion relief device showing a restraint which is another type of spring mounted inside a vessel.

FIG. 5 is a transverse, vertical, sectional view of an explosion relief device showing a restraint which is a viscoelastic connector mounted outside a vessel.

DETAILED DESCRIPTION

Figure 6:
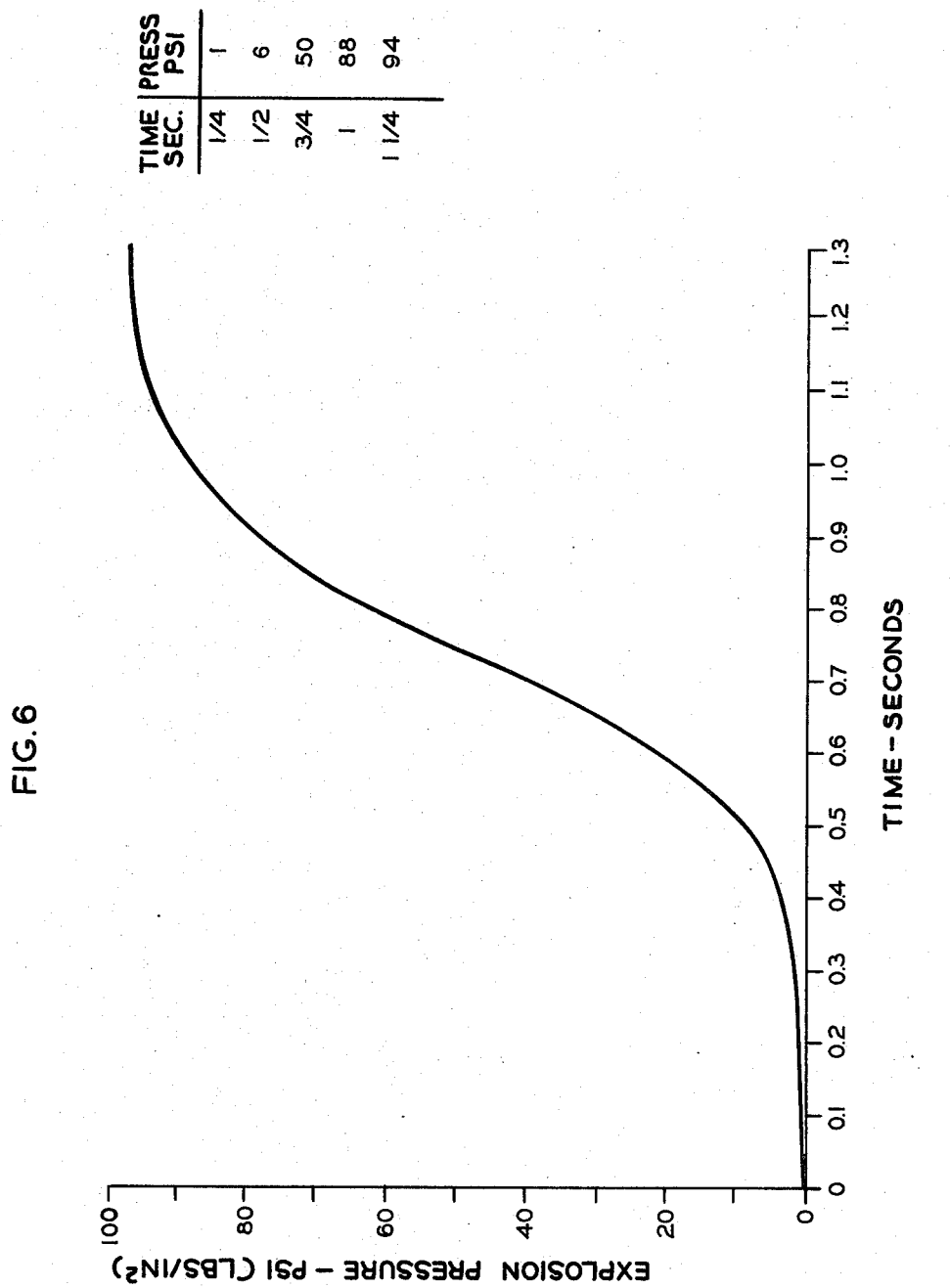
FIG. 6 is a typical plot of explosion pressure as a function of time after the initiation of the pressure rise, such as the time of deflagration.

In the drawings the numeral 10 designates the wall or shell of a vessel which may be of any suitable or desired type, construction, dimension or configuration. The vessel may be utilized for a wide variety of functions, e.g. a reactor, a separator, a storage tank, bin, container, or hopper, a surge tank, etc., where there is a danger of explosion or other type of rapid pressure rise with or without the presence of flame and it is desirable to provide appropriate venting to minimize damage from any explosions or rapid increases in pressure which may occur within the vessel. The vessel may be utilized at, above, or below normal atmospheric pressure although in most cases the vessel is utilized at about normal atmospheric pressure. Where the vessel is used as a storage hopper for dry materials the device of this invention is particularly useful in venting dust explosions.

The numeral 11 designates a displaceable cover of the vessel which is positioned upon the vessel to close an opening in the shell 10 of the vessel but upon an abrupt change of pressure such as caused by an explosion within the vessel is capable of being displaced from the opening. The displaceable cover is usually not connected to the shell 10 of the vessel other than by a restraint 12 of this invention. However, it may be desirable also to fasten the cover to the shell by low strength welds, shear pins or other suitable means under certain circumstances such as where the vessel is utilized at greater than atmospheric pressure and the cover will not remain in place only under the force of gravity, where it is not desired to vent through the opening until a given vessel pressure level is exceeded, or where the opening in the shell is in such a position that the cover will not stay in place without being fastened to the shell. If it is desirable to attach the cover to the vessel by such additional means, it is preferred to design such additional attaching means so that the cover, when displaced, breaks said means without substantially altering the direction of the cover's movement from the vessel and thus does not concentrate its force on any single restraint of this invention when a plurality of said restraints are used. In such a preferred embodiment the design of the restraints is simplified since each restraint may be designed to have substantially the same energy-absorbing capacity. The displaceable cover 11 may be of any suitable size, shape or weight. The problem of unrestrained movement of the cover after displacement from the vessel opening becomes more critical as the size or weight of the cover is increased. The present invention is particularly useful where the displaceable cover closes an opening having a perimeter exceeding 20 feet or where the vessel requires full diameter venting.

A restraint 12 connects the cover 11 to a fixed base. The fixed base may be an exterior member 13 as illustrated in FIGS. 3 and 5, the vessel shell 10 as illustrated in FIGS. 1, 2, and 4 or an interior member connected to the vessel which embodiment is not illustrated. The exterior member 13 may be in a vertical, horizontal or other orientation. The placement, shape, or composition of the exterior member 13 is not critical so long as it provides a fixed anchor point for the restraint 12 and does not interfere with the movement of the cover 11 away from the vessel other than by its coaction with the restraint 12. Neither is the placement of the connection of the restraint on the cover critical. In a preferred embodiment where the restraint 12 is connected to the vessel shell 10 the placement of the connection on the vessel shell likewise is not critical.

When only one restraint connects the cover to the fixed base the restraint may preferably be connected to the center portion of the cover. When a plurality of restraints connects the cover to the fixed base the restraints may preferably be connected near the edge portion of the cover. More preferably when a plurality of restraints connects the cover to the fixed base the restraints may be positioned at spaced intervals substantially along the perimeter edge portion of the cover. Still more preferably when a plurality of restraints connects the cover to the fixed base the restraints may be positioned substantially symetrically at spaced intervals substantially along the perimeter edge portion of the cover.

The type of attaching means for connecting the restraint to the cover or to the fixed base is not critical. Illustrative examples of suitable attaching means include, but are not limited to, lugs cast in, welded to or bolted to the cover or fixed base, U bolts, eye bolts direct attachment to the cover or fixed base by welding, bolting, riveting, or other suitable method, etc.

The restraint 12 may consist of a single extensible member 14 as shown in FIG. 3 and 5. Preferably, however, the restraint comprises an extensible member 14 and one substantially inextensible member 15 as in FIG. 2 or an extensible member 14 and two substantially inextensible members 15, as in FIGS. 1 and 4. The inextensible members may be of any suitable material such as steel, iron, non-ferrous metal, alloys of metals, coated metals, reinforced polyester resin, reinforced epoxy resin, etc., and in any suitable form such as a rod, chain, cable, other composite form or a combination of forms.

An extensible member has a yield point. Illustrative examples of an extensible member are a spring (FIG. 4) a coil spring (FIGS. 1, 2 and 3) and a viscoelastic connector (FIG. 5). A preferred extensible member has a yield strength which is less than its ultimate tensile strength. A suitable viscoelastic connector may be formed from a variety of known viscoelastic damping materials. Some of the suitable polymers include the copolymers of a vinyl halide, e.g., vinyl chloride, vinyl fluoride, vinylidene chloride, 1,1-dichloro-2-fluoroethylene or vinylidene chlorofluoride and such olefins as ethylene, propylene, or 2-butene. Other suitable polymers include the copolymers of a vinyl halide, e.g., vinyl chloride, vinyl fluoride, vinylidene chloride, 1,1-dichloro-2-flouroethylene or vinylidene chlorofluoride and such vinyl alkanoates as vinyl acetate, vinyl propionate or vinyl butyrate. The ratio of vinyl halide to vinyl alkanoate which is present in the copolymer may vary widely, e.g., there may be present from say, 5 to 95 parts by weight of vinyl halide with the balance being the vinyl alkanoate. As is known in the art, in the vinyl halide-vinyl alkanoate copolymers, both hardness and thermal resistance increases with the vinyl halide content of the copolymer. Hence when such characteristics are desired, the copolymer advantageously consists at least 50 percent by weight of vinyl halide, with the balance being the alkanoate. Particularly when the composition is designed for use in applications involving hazards of fire, it is desireable to employ in the copolymer component a vinyl halide-vinyl alkanoate ratio of, say, 80:20 to 95:5. Fillers, plasticizers, stabilizers, and other additives known in the art may be used with the above polymers to obtain the desired elongation and tensile properties. Likewise olefins such as polyethylene, polypropylene and copolymers thereof as well as partially drawn nylons such as polycaproamide and polyhexamethylene adipamide and partially drawn polyesters such as polyethylene terephthalate are also useful. The critical factor in determining whether an extensible member may be formed from any given polymer composition is that the extensible member exhibit a yield point in its stress/strain curve. The extensible member may be molded in a variety of shapes such as a strap, belt, rod or tube with or without connecting means integrally molded into the extensible member. Likewise, the extensible member may be extruded and fabricated to form a web or other type of connecting shape. Polymeric materials having low strength may necessitate the use of a plurality of extensible members to provide sufficient strength to restrain the movement of large covers. Fewer members of larger cross-section may provide an alternate means of providing sufficient strength to satisfactorily restrain the movement of large covers.

An extensible member useful in the device and method of this invention when extended beyond its yield point exhibits no substantial elastic tendency to resume its unextended shape. Thus, such an extensible member, when utilized to decelerate and stop a cover of a vessel displaced by an explosion within the vessel, does not exert any substantial accelerating force to the return of said cover, i.e., once the extensible restraint stops the cover it does not tend to substantially accelerate the cover in any direction as a result of any tendency of the restraint to regain its former unextended shape. It is recognized that, when an extensible member comprising a spring or viscoelastic connector is extended beyond its yield point, in some instances, a measurable movement or creep may occur which results in a gradual diminution of the extended length of the member. Such diminution of length of the extensible member extended beyond its yield point does not substantially accelerate the cover's return and any force it exerts on the cover is negligible particularly when compared to the accelerating force of gravity acting downwardly on the stopped cover.

Because of the great weight of large covers, and particularly those covers for openings giving full diameter venting to vessels, springs formed from high strength metals and alloys of metals are preferred extensible members. Because of their high strength, relatively reasonable cost, and ready availability steel springs are more preferred extensible members. Because of their relatively high level of additional elongation after being extended beyond their yield point steel coil springs are still more preferred extensible members.

The number of extensible restraints is not critical. Whether to use fewer high strength restraints or a greater number of lower strength restraints is a matter of choice so long as the strength of all the restraints is sufficient to stop the motion of the displaceable cover away from the vessel before the restraints fail under the force of the moving cover.

The following description of calculations for a typical installation of an explosion relief device of this invention may more clearly illustrate the method for restraining the movement of a cover displaced by an explosion within a vessel.

A cylindrical vessel 10 feet in diameter and 35 feet high to be used for the storage of a flammable material, is designed to have a vent ratio of full vessel diameter at forty pounds per square inch gauge pressure. The rate of increase of pressure resulting from an explosion of the flammable material within the vessel is determined. A plot of explosion pressure versus time shown in FIG. 6 illustrates how pressure increases with time in a closed unvented vessel. The weight of the displaceable head or cover of the vessel is determined. For this illustrative case it is found to be 1,275 pounds. A full diameter cover or head weighing 1,275 pounds will separate upward from the vessel when the pressure within the vessel reaches a value where that pressure acting uniformly on the area of the head gives an upward force equal to the weight of the head. This pressure is 0.1128 pounds per square inch and is reached at 0.0156 second after the initiation of the deflagration within the vessel. Depending on the area and weight of the cover, this time will be shorter or longer, but generally speaking, the larger the area and the lighter the weight, the shorter the time and the smaller the area and the heavier the weight, the longer the time.

The kinetic energy of the displaceable cover acted upon by the force of the explosion is then calculated to determine the energy which must be absorbed by the extensible restraint to decelerate and stop the cover. It is generally recognized by safety experts knowledgeable in venting explosions within vessels that the force of such an explosion, in this size and type of vessel, is fully vented when a displaceable cover of the vessel has been displaced 30 inches from the vessel, i.e., after the cover is displaced 30 inches from the vessel, the explosive force exerted on its equals zero. In order to be certain that the extensible restraint will restrain the displaceable cover without failure, the worst case, i.e., where the pressure acts on the cover for the full thirty inches and then abruptly drops to zero, is assumed. From the dimensions and weight of the cover as well as the pressure time relationship shown in FIG. 6 the velocity of the cover when displaced upward 30 inches from the vessel by an explosion may be calculated and in this case is found to be 427.86 inches per second or about 24 miles per hour. Such 30 inch displacement is reached 0.278 seconds after the initiation of deflagration. The kinetic energy of a 1,275 lb. cover moving at a velocity of 427.86 inches per second as a result of a maximum force of explosion within the vessel is found to be 304,000 inch pounds per second.

For convenience in this illustrative embodiment, six extensible restraints are connected to lugs welded to the interior edge portion of the cover at substantially equally spaced intervals and to lugs welded to the interior edge portion of the vessel as shown in FIG. 1. A smaller or larger number of restraints may be used depending on the circumstances. The restraints may also be connected to the exterior of the cover. Likewise the restraints may alternatively be connected to a fixed base rather than to the vessel itself. The extensible restraint in this illustrative installation consists of a coil spring and two inextensible wire ropes of such length to provide 30 inches of free travel for the cover upward from the vessel. Depending on the proximity of other obstructions to movement of the cover and other considerations a greater or lesser amount of free travel may be allowed for the cover. In some installations of the device of this invention no free unrestrained travel for the cover may be allowed. Likewise the extensible restraint may consist only of an extensible member or an extensible member and one inextensible member. The coil spring of this illustrative restraint is sized so that the combined spring rate of the six springs is such that the springs are extended beyond their elastic limit in absorbing the kinetic energy of the moving cover as calculated above. A detailed description of the springs follows:

| | |
|---|---|
| Spring rate | 80 pounds per inch |
| Number of active coils | 44 |
| Outside diameter of coil | 4 inches |
| Mean diameter of coil | 3.4375 inches |
| Coil wire diameter | 9/16 inches |
| Free length of active coils | 27 inches |
| Eye to eye length of spring | 31 ½ inches |
| Normal extension of spring | 13 to 14 inches |
| Maximum extension of spring without permanent set | 20 inches |
| Normal permanent set at 22 inch extension of spring | ½ inches |

Figure 7:
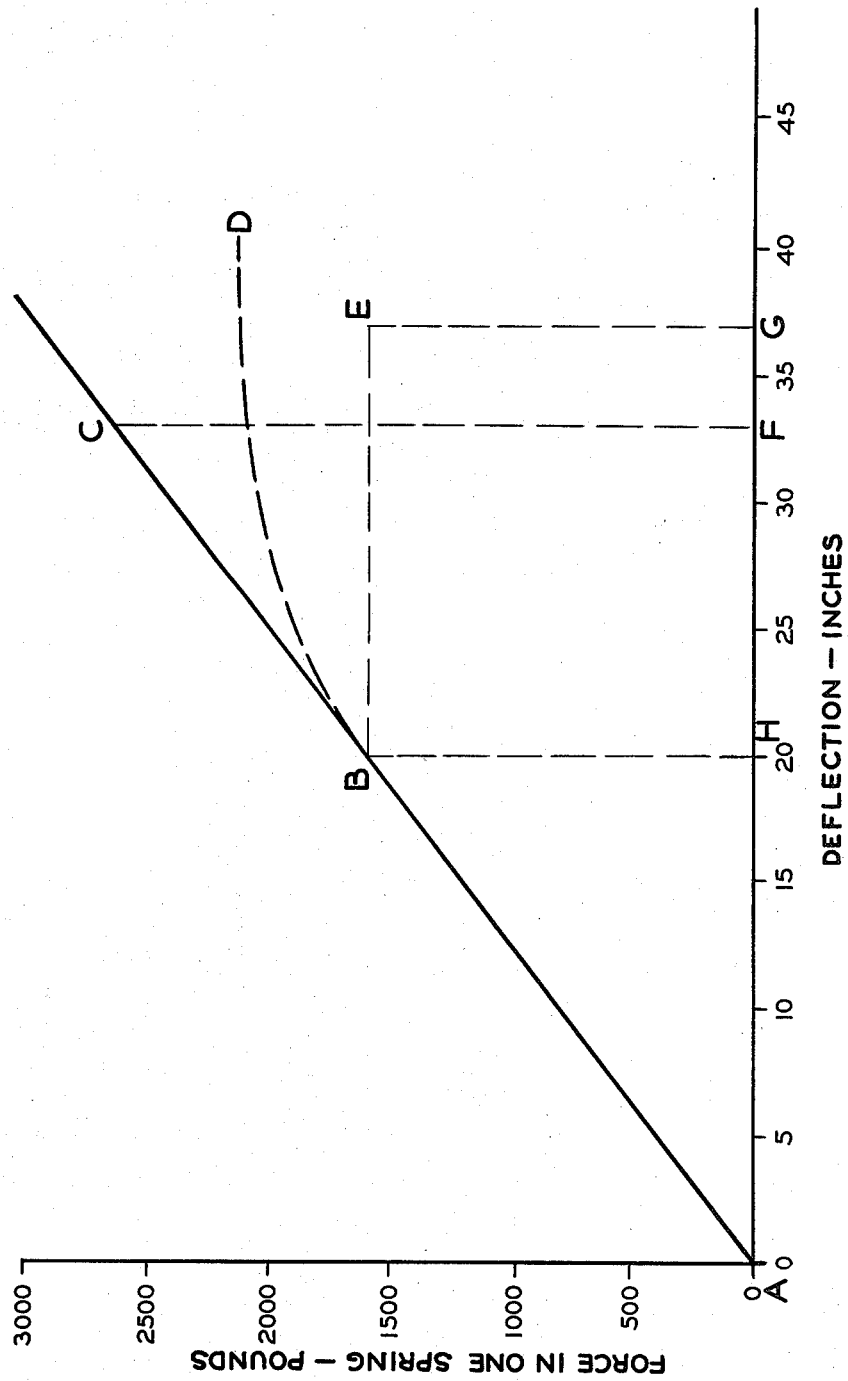
FIG. 7 is a typical plot of force of a spring in pounds as a function of spring deflection.

The ends of the spring are coned down and terminated in a 1 inch round eye completely closed. The combined spring rate of the six springs is 480 pounds per inch of elastic extension. If the six springs described above could act fully elastically to decelerate and stop the displaceable cover, the stopping distance, which is defined as the distance traveled by the displaceable cover away from the vessel from the point where the extension of the extensible restraint is initiated to the point where the displaceable cover stops moving away from the kettle, would be 35.5 inches, excluding the retarding effect of gravity on upward movement and 32.9 inches when the effect of gravity is included in the calculations. However, the springs cannot stretch elastically to 32.9 inches but only to about 20 inches. It is therefore necessary to approximate the stopping distance of the cover where the spring acts elastically for part of the stopping distance and acts inelastically for the remainder of the stopping distance to be certain that the springs will have sufficient inelastic elongation capacity to accommodate the full stopping distance of the cover without failure. FIG. 7 represents spring deflection (which, in this case, is equal to the stopping distance of the cover) related to the spring force of one of the restraints. The area under the line segment ABC represents the work done or energy absorbed by one of the restraints where the spring acts elastically in conjunction with the force of gravity to decelerate and stop the cover in its movement away from the vessel under the force of an explosion within the vessel as defined above. This gives the lower limit for stopping distance for the cover of 32.9 inches (Line segment AF). The upper limit for stopping distance of the cover is approximated (Line segment AG) from a computation of the distance of inelastic extension of the spring (the length of line segment BE or HG) to give an area under line segments AB and BE approximately equal to the area under line segment ABC adjusted for the greater effect of the force of gravity in the upper limit for stopping distance. In this computation it is assumed that the springs act elastically for a distance of 20 inches (Line segment AB), beyond this distance the springs yield, and the yield load for the springs as they inelastically extend until the cover stops is a constant value equal to the elastic load at 20 inches extension (20 inches multiplied by 80 pounds per inch equals 1,600 pounds). Based on these assumptions the additional inelastic extension (Line segment BE or HG) to absorb the amount of free energy of the cover at the end of free travel adjusted for the effect of the force of gravity may be approximated as follows:

$E_S$ = work or energy absorbed by one spring = area a under $AB$ and $BE$ in FIG. 7

$E_S$ = area of $ABH$ + area of $BEGH$ $E_S$ = ½ $(BH)(AH) + (BH)(HG)$

Where $X$ = the distance $AG$ = stopping distance of cover and $X - 20$ = the distance $HG$ then $E_S$ = ½ (1,600 lbs.) 20 " + (1,600 lbs.) $(X-20")$ $E_S$ = 1,600 lbs. $(X - 10") $ = work or energy absorbed by one spring where $g$ = the force of gravity = 32.2 feet per second per second $m$ = mass of the cover $w$ = weight of the cover = 1,275 pounds and if the initial velocity ($V_o$ of a 1,275 lbs. head is 427.86 in/sec, its kinetic energy = ½$mV_o^2$ = ½ $W/g\ V_o^2$ = ½ 1,275 lbs./32.2 ft/sec²(12 in/ft) × (427.86 in/sec)²

= 30,4000 in lbs.

The force of gravity will dissipate energy also by converting kinetic energy to potential energy ($E_p$)

$$E_P = wX = 1,275\ lbs.\ X$$

The total energy ($E_T$) absorbed in a given travel of $X$ inches is $E_T = E_P + NE_S$ where $N$ is the number of springs $E_T = 1,275X + N\ (1,600)\ (X-10)$ Now $X$ is determined to give $E_T$ = 30,4000 in lbs. with six springs $E_T = 1,275 + 6\ (1,600)\ (X-10) = (1,275 + 9,600)\ X - 96,000$ $E_T = 10,875\ X - 96,000$ This relationship gives the following values for $E_T$ at various distances.

| X Inches | $E_T$ Inch-Pounds |
|---|---|
| 20 | 121,500 |
| 30 | 230,250 |
| 40 | 339,000 |
| 36 | 295,500 |
| 37 | 306,375 |

From the above calculations, it is evident that the upper limit for stopping distance (Line segment AG) is approximately 37 inches with 20 inches being elastic extension and approximately 17 inches being inelastic extension (Line segment BE). The actual stopping distance lies somewhere between points F and G. Curve ABD of FIG. 7 offers a somewhat better estimate of the shape of the knee in the yield and strain-hardening curve describing the action of the spring and gives an estimated stopping distance of about 35 inches. An actual explosion in a test installation of this device of this invention indicates that curve ABD is a fairly close approximation of the spring characteristics.

The foregoing description of the invention is explanatory thereof and various changes in the size, shape and materials, as well as in the details of the illustrated construction may be made within the scope of the appended claims, without departing from the spirit of the invention.

We claim:

1. A method for restraining a displaceable cover of a vessel in which explosions may occur comprising connecting the displaceable cover to a fixed base by an extensible restraint having a yield point, upon the occurrence of an explosion within the vessel, absorbing the kinetic energy of the cover, as the cover moves away from the vessel as a result of the force of the explosion, by the extension of the restraint beyond its yield point, stopping the cover before the restraint fails under the force of the moving cover, and maintaining a connection between the cover and the fixed base without substantially accelerating the cover's return.

2. The method of claim 1 wherein the vessel is a storage hopper.

3. The method of claim 1 wherein the displaceable cover is a head of the vessel.

4. The method of claim 1 wherein the fixed base is the vessel.

5. The method of claim 1 wherein the extensible restraint comprises an extensible member and a substantially non-extensible member.

6. The method of claim 1 wherein the extensible restraint is a spring.

7. The method of claim 1 wherein the extensible restraint is a coil spring.

8. The method of claim 1 wherein the extensible restraint is a viscoelastic connector.

9. The method of claim 1 wherein the displaceable cover is connected to the fixed base only by the restraint.

* * * * *

UNITED STATES PATENT OFFICE
CERTIFICATE OF CORRECTION

PATENT NO. : 3,788,514
DATED : January 29, 1974
INVENTOR(S) : FREDERICK A. GIACOMA, JR. ET AL It is certified that error appears in the above-identified patent and that said Letters Patent are hereby corrected as shown below:

IN THE CLAIMS

CANCEL CLAIM 8

Signed and Sealed this twenty-third Day of March 1976

[SEAL]

Attest:

RUTH C. MASON
*Attesting Officer*

C. MARSHALL DANN
*Commissioner of Patents and Trademarks*